United States Patent Office 3,088,809
Patented May 7, 1963

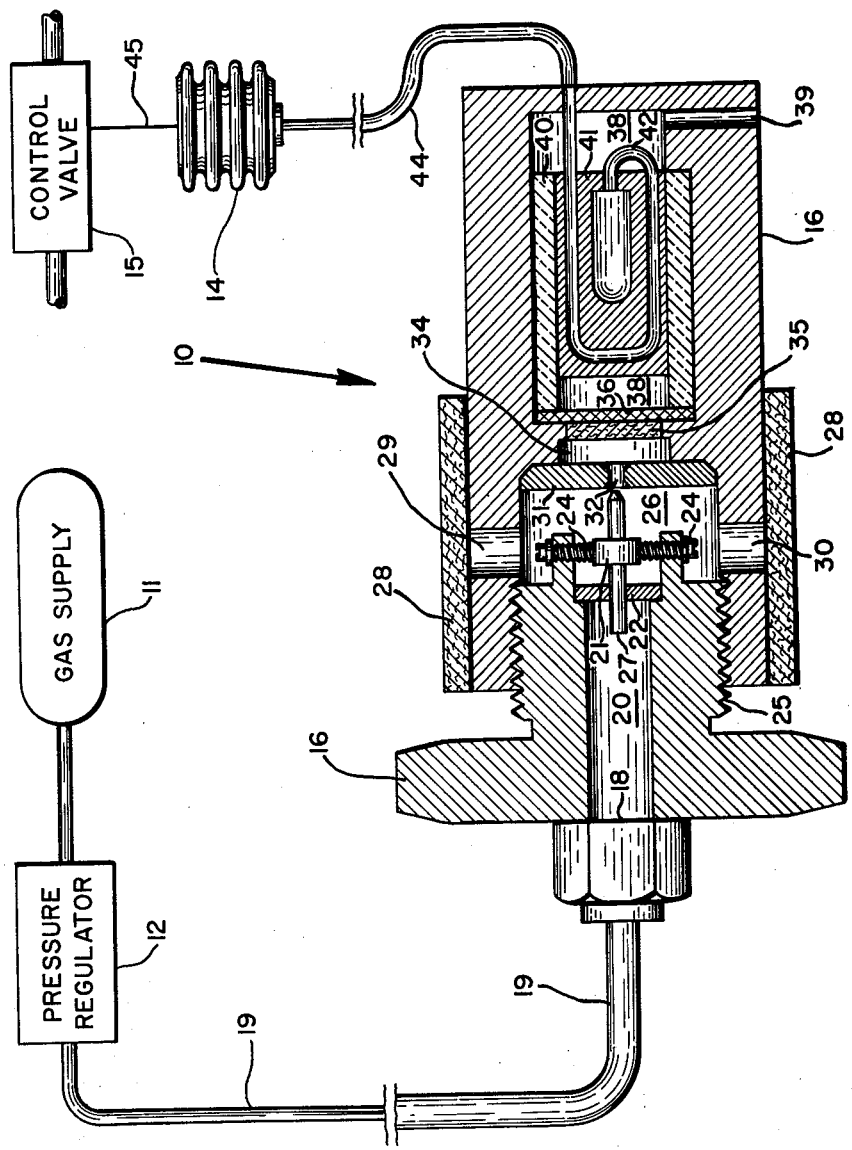

3,088,809
OXYGEN DETERMINATION
Paul M. Boatman, Davenport, Iowa, assignor to The Bendix Corporation, a corporation of Delaware
Filed Oct. 3, 1960, Ser. No. 60,128
3 Claims. (Cl. 23—232)

This invention relates to a method and apparatus for detecting the percentage of a selected gas in a body of gas and for utilizing that information and more particularly to a method and apparatus for the measurement of the partial pressure of oxygen in a natural or synthetic atmosphere for the purpose of environmental control.

While in flight, space vehicles and high performance aircraft require continuous indications and/or control of the ambient and environmental conditions. For example, such craft occupants and the continuous indication of flight conditions which vary as a function of ambient pressure.

An object of the invention is to provide a method and apparatus for the detection of the partial pressure of a selected gas in a natural or synthetic atmosphere.

Another object of the invention is to provide a method and apparatus for the detection of the partial pressure of oxygen in a natural or synthetic atmosphere for the purposes of environmental control.

A further object of the invention is to provide a method and apparatus for the detection of the partial pressure of hydrogen in a natural atmosphere for the purpose of the continuous indication of a flight condition.

Present methods and apparatus for detecting and indicating the partial pressure of oxygen require an external power source, amplification of the detector output, and have been found to be excessively sensitive to environmental changes. Two well known methods rely on the utilization of the polaragraphic and paramagnetic principles and have resulted in apparatus which is bulky and apparatus which requires frequent recalibration and part replacement.

A still further object of the invention is to provide a partial pressure oxygen sensor which is self-powered, is only predictably impaired by radical changes in environmental conditions and is capable of utilizing the sensor output to control directly an environmental system or an indicating apparatus.

In environmental control of habitable spaces the regulation of the partial pressure of oxygen is a necessary requirement. This is particularly true in a closed ecological system for manned space flight wherein it is necessary to continuously sense and control the partial pressure of oxygen within a closed circuit respiratory system. The nature of the environment to which the apparatus for sensing and control is subjected in such a system requires that the apparatus be of rugged construction to physically withstand the vibration and gravitational forces to which it is subjected. The operation of the sensor-control must be continuous which requires that the apparatus be completely unimpaired or only predictably impaired by reason of vibration, gravitational loading, vehicle attitude, ambient temperature, and pressure variation, in sample constituents and system total pressure. The requirement that the apparatus be only predictably impaired demands that the variance from a desired operation is consistently determinable and can be corrected to fall within the required limits of variation from the optimum by incorporating corrective elements into the sensor-control apparatus.

A still further object of the invention is to provide a sensor-control apparatus for use in a closed ecological system which continuously senses and controls the partial pressure of oxygen over the full range of possible environmental conditions.

A still further object of the present invention is to provide a method and apparatus which utilizes the hydrogen-oxygen reaction in sensing the partial pressure of oxygen in a synthetic atmosphere.

A still further object of the present invention is to provide an oxygen partial pressure sensor which is accurate, small, light weight, and relatively inexpensive.

Certain of these objects are realized in the invention by the provision of a controlled gaseous supply, means for reacting said supply and a sample of the atmosphere to be sensed, and means for utilizing the heat of said reaction for atmospheric control.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purposes of illustration and description and is not to be construed as defining the limits of the invention.

The single FIGURE of the drawing is a schematic showing of an environmental control system embodying the invention.

While the invention is applicable to detection for the indication of flight conditions which vary as a function of ambient pressure, it is especially advantageous for detection and control of environmental conditions. Accordingly, an embodiment for the detection of the partial pressure of oxygen for environmental control has been selected for illustration but the invention should not be considered to be limited thereto.

Referring now to the drawing which illustrates an environmental control system there are shown an oxygen partial pressure sensor 10, a combustible gas supply 11, a gas pressure regulator 12, a pressure responsive bellows 14 and a gas control valve 15. Pressure regulator 12 receives gas from supply 11 and supplies said gas to sensor 10 at a predetermined pressure. Within sensor 10 the gas from supply 11 is combined with a portion of the sample gas inspirated into sensor 10. The temperature change arising out of the combination of gases is transferred into a mechanical movement at bellows 14 which movement is utilized to control the valve 15.

In environmental control the components of the system may be utilized to supply gas to the vehicle occupants by two methods. Sensor 10 may be exposed to the ambient air surrounding the vehicle whereby the position of bellows 14 will indicate altitude and the associated valve 15 will control the supply of gas physiologically required as a function of altitude. A second method, and the embodiment of the invention chosen for illustration, will have sensor 10 exposed to the air within an enclosed vehicle wherein the pressure is maintained substantially constant. The position of bellows 14 will indicate the partial pressure of a component gas and the associated valve 15 will maintain a substantially constant partial pressure of the component gas within the vehicle.

In environmental control for breathing purposes the regulation of the partial pressure of oxygen is required. Sensor 10 will draw in sample air, a component of which is oxygen, the gas to be regulated. Gas supply 11 contains a combustible gas which can be combined with oxygen, advantageously the gas may be hydrogen or a combination of combustible gases. Where discarding of the combustion products is not possible, a gas which will not produce a toxic waste product is necessary, for example, a gas or combination of gases which would produce carbon dioxide should not be used. Partial pressure sensor 10 may produce a substantial pressure drop through the system requiring the combustible gas to be a heavy gas to produce the kinetic energy which the system requires, for example, nitrogen gas may be a constituent of the combustible gas supply. Gas supply 11 is in fluid communication with pressure regulator 12 which supplies the combustible gas to the partial pressure sensor 10 at a predetermined pressure.

When utilizing the present invention for the indication of a flight condition, for example, apparatus for indicating altitude or an altitude release mechanism, sensor 10 is exposed to the ambient air surrounding the flight vehicle. A detectable component gas of the atmosphere is hydrogen which gas increases in percentage with altitude, therefore the present invention is especially advantageous for high altitude indication. For the detection of hydrogen as the component gas of the atmosphere, combustible gas supply 11 may advantageously comprise oxygen. The position of bellows 14 will indicate altitude and may be directly connected to an altitude indicating mechanism (not shown).

Oxygen partial pressure sensor 10 includes a housing 16 having a gas inlet 18 in fluid communication with pressure regulator 12 by means of tubing 19. Housing 16 defines a jet supply chamber 20 which is in fluid communication with the inlet 18. Metering jet 21 is placed at the opposite end of inlet 18 of supply chamber 20 and is held at said opposite end by means of holding plate 22. Jet 21 is positioned in all planes by means of adjusting screws 24 and adjustable mounting 25. It extends from jet supply chamber 20 through holding plate 22 and into aspirating chamber 26 where it terminated in jet nozzle 27.

The ambient atmosphere surrounding partial pressure sensor 10 is aspirated into aspirating chamber 26 through sample inlet filter 28, sample inlets 29 and 30. Sample inlet filter 28 removes small particles from the ambient atmosphere to prevent impairment to the system by plugging up its components.

Venturi plate 31 has a venturi opening 32 disposed adjacent to said jet nozzle 27 for receiving gas from said nozzle 27. The regulated gas from supply 11 passes through metering jet 21, which is properly positioned at the venturi opening 32 and aspirates the sample atmosphere whereby it is mixed with the sample atmosphere in the venturi opening 32.

Sensor 10 is operable over a wide range of ambient pressures and temperatures and its accuracy can be precisely predicted. Therefore the environmental control system can be made very accurate over a wide range of ambient conditions if a high degree of accuracy is essential. Advantageously, within the scope of the present invention, the system may include temperature and pressure compensating apparatus for altering the output signal in accordance with variations in ambient temperature, and pressure compensating apparatus for varying the supply pressure as a function of ambient pressure. When the operating range is limited or when ordinary accuracy is satisfactory, these compensating means may be omitted as in the embodiment illustrated. For ordinary applications supply gas may be considered to pass through jet nozzle 27 at a constant velocity aspirating sufficient ambient air to provide a constant volumetric proportion of supply gas and ambient air in venturi 32 regardless of ambient conditions.

Venturi opening 32 provides a fluid passage from aspirating chamber 26 to repressurization chamber 34. Gas entering chamber 34 is reduced in velocity as a result of the increase in size of chamber 34 from venturi 32. The gas having a high velocity pressure in venturi opening 32 is converted into a gas having a high static pressure, this static regain is necessary where the system components downstream offer a strong resistance of the flowing gas. Repressurization chamber 34 is defined by housing 16, venturi plate 31, and diffusor 35. Catalytic screen 36 is disposed downstream of said diffusor and in fluid receiving relationship thereto. Diffusor 35 accomplished even distribution of the fluids across catalytic screen 36.

Exposure of the mixed gases from diffusor 35 to the catalyst may be accomplished in several forms and advantageously shown has the form of the screen 36. In an oxygen-hydrogen reaction catalytic screen 36 may be made of palladium or a palladium coated meshed material. Advantageously the catalytic screen 36 may be platinum.

Sensor chamber 38 is defined by housing 16. It has an exhaust outlet 39 and is disposed downstream of said screen 36. Insulator 40 lines the interior sensor chamber 38 to prevent excessive heating of housing 16. Heat exchange matrix 41 is disposed within insulator 40 for promoting the uniform transfer of the heat from chamber 38 to a heat sensing element. The sensing element is disposed within heat exchange matrix 41 and may take the form of a thermocouple or advantageously, as shown, may comprise a closed fluid filled, pressure sensing line 42 whose fluid pressure values are variable with the temperature of reaction in chamber 38. Pressure sensing line 42 and pressure responsive bellows 14 are connected by means of pressure capillary 44. The heat of reaction in chamber 38 is thereby represented as the degree of mechanical expansion of bellows 14. Environment control valve 15 is connected directly to bellows 14 by any well known mechanical or electrical connecting means 45. Advantageously in an environmental control system valve 15 may regulate the flow of oxygen into an enclosed breathing system at a rate dependent upon the partial pressure of oxygen in the ambient air as sensed in chamber 38 as a variation in temperature.

It is to be expressly understood that within the scope of the invention the control valve 15 may be a mechanism for indicating a flight condition such as altitude wherein the heat of reaction in chamber 38 would indicate a percentage of gas in the ambient atmosphere and thus a particular altitude.

In operation of the sensor 10 when used in an environmental control system as shown in the drawing, hydrogen in the gaseous state is stored in gas supply tank 11 and supplied to pressure regulator 12. The hydrogen gas flows through tubing 19 and into jet supply chamber 20 where it is maintained at a predetermined pressure by pressure regulator 12.

The hydrogen gas will flow through metering jet 21 and nozzle 27 which is properly positioned at the entrance to venturi 32. The gas flowing out of nozzle 27 will aspirate the sample ambient atmosphere to be tested through filter 28 and inlets 29 and 30 and into chamber 26. The hydrogen gas and the aspirated sample gas will mix in venturi 32 and pass into repressurization chamber 34. The mixture then passes through diffusor 35 which may be a porous plug or advantageously, as shown, a screen to aid in the even distribution of the mixture of gases across catalytic screen 36. Upon exposure of the gas mixture to the screen 36 the hydrogen supplied combines chemically with the oxygen of the sample ambient air. The hydrogen supplied will be of sufficient quantity to react all of the oxygen in the sample. The chemical combination of the hydrogen and oxygen forms water and releases thermal energy at an elevated temperature of the gaseous mixture. The heated combustion products pass through heat exchange matrix 41 which transfers a portion of the thermal energy produced to the sensing element 42. The fluid in the sensing element 42 expands and/or vaporizes as the temperature increases thereby increasing the pressure in capillary 44 and in pressure responsive bellows 14. The movement of bellows 14 actuates control valve 15 through electrical or mechanical means 45 whereby the oxygen in an enclosed environmental system may be regulated.

While the environmental control system as shown in the drawing is of the construction shown and described, it is understood that the instant invention is not limited to any particular form or construction. Moreover, other changes and modifications of the novel sensor contem-

I claim:
1. The method of continuously sensing the partial pressure of oxygen in one of a natural and a synthetic atmosphere for environmental control by utilizing the heat of the oxygen-hydrogen reaction which comprises the steps of supplying said hydrogen at a predetermined pressure in sufficient quantity to react all of the oxygen in a sample of said atmosphere, metering said hydrogen at a predetermined rate to inspirate said atmosphere, continuously homogeneously mixing said hydrogen and said atmosphere in a volumetric ratio substantially equal to a predetermined value, diffusing the mixed gases to a palladium catalyst, catalytically reacting all of said oxygen of said atmosphere with said hydrogen by means of exposure to said palladium catalyst, and continuously sensing the heat of reaction as a variation in temperature gradient.

2. The invention defined in claim 1 wherein said hydrogen is a hydrogen-nitrogen mixture.

3. The invention defined in claim 2 wherein platinum is substituted for said palladium.

References Cited in the file of this patent
UNITED STATES PATENTS

| | | |
|---|---|---|
| 1,390,497 | Chance et al. | Sept. 13, 1921 |
| 1,442,574 | Johnson | Jan. 16, 1923 |
| 1,644,123 | Griswold | Oct. 4, 1927 |
| 1,942,323 | Blodgett | Jan. 2, 1934 |
| 1,957,341 | Holt | May 1, 1934 |
| 2,585,882 | Weissman et al. | Feb. 12, 1952 |